(12) United States Patent
De Beer et al.

(10) Patent No.: US 9,090,035 B2
(45) Date of Patent: Jul. 28, 2015

(54) MOLDED HOLLOW CYLINDER WITH A THREAD AND PROCESS FOR ITS MANUFACTURE

(71) Applicant: VOSS Automotive GmbH, Wipperfürth (DE)

(72) Inventors: Daniel De Beer, Engelskirchen (DE); Günter Sieper, Remscheid (DE)

(73) Assignee: VOSS AUTOMOTIVE GMBH, Wipperfurth (DE)

(*) Notice: Subject to any disclaimer, the term of this patent is extended or adjusted under 35 U.S.C. 154(b) by 80 days.

(21) Appl. No.: 13/709,484

(22) Filed: Dec. 10, 2012

(65) Prior Publication Data
US 2013/0240528 A1   Sep. 19, 2013

(30) Foreign Application Priority Data
Dec. 19, 2011  (DE) .......................... 10 2011 056 601

(51) Int. Cl.
| | |
|---|---|
| *B29C 45/18* | (2006.01) |
| *B29D 99/00* | (2010.01) |
| *B65D 51/00* | (2006.01) |
| B29C 45/26 | (2006.01) |
| B29C 45/00 | (2006.01) |
| B29L 1/00 | (2006.01) |
| B29K 77/00 | (2006.01) |
| B29K 81/00 | (2006.01) |
| B29K 105/12 | (2006.01) |

(52) U.S. Cl.
CPC ........ *B29D 99/0096* (2013.01); *B29C 45/0025* (2013.01); *B65D 51/00* (2013.01); *B29C 45/0005* (2013.01); *B29C 45/0046* (2013.01); *B29C 45/2618* (2013.01); *B29C 2045/0027* (2013.01); *B29K 2077/00* (2013.01); *B29K 2081/06* (2013.01); *B29K 2105/12* (2013.01); *B29L 2001/00* (2013.01); *B29L 2001/005* (2013.01); *B29L 2001/007* (2013.01)

(58) Field of Classification Search
CPC .................. B29C 2045/0027; B29C 45/0046; B29C 45/2618
USPC ..................................................... 264/328.12
See application file for complete search history.

(56) References Cited

U.S. PATENT DOCUMENTS

| | | | |
|---|---|---|---|
| 4,403,933 A | 9/1983 | Davis et al. | |
| 5,145,630 A * | 9/1992 | Schad ........................ | 264/328.8 |

(Continued)

FOREIGN PATENT DOCUMENTS

| | | |
|---|---|---|
| DE | 10 2008 018 514 A1 | 10/2009 |
| DE | 102010010651 | 11/2010 |

(Continued)

OTHER PUBLICATIONS

Die Methode der Zugdreiecke im Vergleich mit anderen Kerbformen—May 2008.
Einblick in die Konstruktion von Spritzuβwerkzeugen—Von Ing. Karl Möorwald, Jan. 1962.
PCT International Search Report—Apr. 16, 2013.
PCT—Transmittal of Copies of Translation of the International Preliminary Report on Patentability—Jul. 3, 2014.

*Primary Examiner* — Jill Heitbrink
(74) *Attorney, Agent, or Firm* — Brinks Gilson & Lione

(57) ABSTRACT

A process for the fabrication of a molded part with circular cross section and a hollowed-out cylindrical base body. An inner channel of the molded part, designed for the sealing with a connector part, has segments with various functions in axial direction. A fiber containing plasticized polymeric mass is injected into the cavity of a molding tool, and following hardening of the polymeric mass, the molded part is removed from the tool. In order to improve strength in a reliable manner, injection into the cavity is carried out radially from the inner channel towards the exterior, in a segment, or in an area of a segment, that does not serve for the mounting of a circumferential seal, or the mounting, and/or arrest of the connector part.

19 Claims, 6 Drawing Sheets

(56) References Cited

U.S. PATENT DOCUMENTS 6,951,626 B2 * 10/2005 Akashi .................. 264/273
2007/0200279 A1    8/2007 Yui
2011/0150602 A1 *  6/2011 Sieper et al. ............ 411/378

FOREIGN PATENT DOCUMENTS

| JP | 2003-35355 | 2/2003 |
| KR | 10-1091967 | 12/2011 |
| WO | WO2009124994 | 10/2009 |

* cited by examiner

MOLDED HOLLOW CYLINDER WITH A THREAD AND PROCESS FOR ITS MANUFACTURE

BACKGROUND

1. Field of the Invention

The present invention is related to a process for the fabrication of a molded part with circular cross section, such as a screw, a nut, a socket, a pipe connector part, a pipe connector or similar, with the molded part designed with a hollowed-out cylindrical base body. The inner channel of the molded part, designed for the sealing reception of a connector part, is equipped with segments with various functions in axial direction for the application of a peripheral gasket, for the direct or indirect mounting, and/or arrest of the connector part, and/or for the support, and/or guiding of the connector part, with the base body featuring at least one internal thread, and/or external thread, where a fiber-containing plasticized polymeric mass is injected into the cavity of a molding tool via at least one injection port of a molding tool. Following the hardening of the polymeric mass, the molded part is removed from the tool. In addition, the present invention relates to a molded part that can be fabricated pursuant to such process.

2. Related Technology

Injection molding is a known, discontinuous forming process, used in particular for plastics. Injection molding allows the large-volume and high-accuracy production of industrial molded parts for immediate use. For that purpose, the respective material, and/or the molding compound, is plasticized in the injection unit of an injection-molding device, and injected into an injection-molding tool. Modern injection molding devices use a worm gear, which plasticizes, transports, and injects the molding compound into the tool. The polymeric mass solidifies inside the cavity and/or mold cavity of the tool. After the solidification, the molded part can be removed from the tool. Generally, the volume loss due to the solidification can be balanced with post-pressure applied prior to the removal—but only to a certain extent. Injection molding may be used for the processing of thermoplastics, thermosetting and elastomeric materials. It is also known technology to use masses containing fibers for the injection molding of thermoplastics, which allows the fabrication of molded parts with comparably higher stability.

A process and a molded part of the type mentioned above are known in WO 2009/124994 A1. A similar molded part is described in DE 10 2010 010 651 A1, with its particular characteristic consisting of the base body of the molded part on one hand, and existing thread gaskets, and/or peripheral gaskets on the other hand, which may be produced from various polymeric materials in a multi-component injection molding process.

Pursuant to the process established in WO 2009/124994 A1, injection into the cavity through a minimum of two injection ports may be carried out in such manner that the fibers will align predominantly in accordance with the maximum shear stress of the molded part, axial tension, and torsion. Injection is carried out in axial direction, with the mass flowing around the internal core of the tool in a circle, converging at the injection ports. Joint lines form at these locations, usually with less stability than the remaining body of the molded part. The structure of the established molded part meeting the operational demands consists on one hand of part of the fibers aligned in circumference-appropriate direction of the circular cross segment at right angles towards the longitudinal axis of the molded part. On the other hand, the structure also consists of one part of the fibers aligned in axial direction of the molded part, each respectively smaller than 50 percent. Surprisingly, this process helps to compensate, at least partly, a negative effect by the joint seam. However, it has been shown that in industrial use, especially with threaded parts, the operational demand of the molded part on the torsion is of less importance than the operational demand of the molded part on the axial tension, with the maximum torque of inserting or unscrewing the molded part without breaking playing a significant role. This results in particular in a demand for increased shear strength, as well as increase in the post-pressure effectiveness. Post-pressure effectiveness means, in particular, that the post-pressure applied leads to homogeneous filling of the cavity, free of hollow spaces, and—if joint seams do exist—to a high degree of joint seam stability. With the described and known multiple gates process a balanced filling of the cavity cannot be guaranteed in every case without additional process-stabilizing measures whenever hot runner nozzles are utilized.

SUMMARY

The object of this invention relates to creating a procedure/technique with process reliability of the type mentioned above, which allows the manufacturing with technologically simple feasibility of a molded part with circular cross section, such as a nut, bushing, pipe connector part, pipe connector or similar with increased stability, in particular axial tenacity.

Related to the method, this problem is solved according to the invention by radial injection into the cavity from the inner channel towards the exterior via the injection port into a segment or a region of the segment not serving for the application of a peripheral gasket, or for the fastening, and/or arrest of the connector part. Preferably, the injection port will be located in an area between the sealing and the clamping area, or between two clamping areas.

Advantageously, injection into the cavity will be carried out with tunnel, ring, disc, or umbrella gates, with the option of a minimum of a two-point injection, preferably up to a five-point injection, in particular a three-point injection zone in the tunnel gating system. Here, injection into the cavity can be carried out via a minimum of two injection ports, equally distributed circumferentially on the circular interior cross segment of the molded part.

Furthermore, this object is met according to the invention, in particular related to the molded part to be produced with the process according to the invention, in as far as the base body is characterized by injection points on the external circumference, or on the lining of the inner channel, arranged in a segment, or in an area of a segment not serving for the application of a circumferential sealing, or for the fastening, and/or for arrest of the connector part.

The fibers in the base body preferably are predominantly oriented parallel to the axial direction of the molded part, in particular also in internal and external recesses, such as circumferential grooves, and/or interior or exterior risers, such as radial protrusions or recesses, as well as in the thread flanks. Advantageously, the injection points can be positioned effectively close to areas with the greatest stress during the installation and use of the molded part. With small distance between the gate area and the load-bearing areas, as well as areas where the screw part optionally is characterized by filigree structures, for example, by a mounting piece still to be described in detail, an optimal post-pressure effectiveness—and thus component stability—can be realized.

Since the injection points are located in segments or areas basically without function related to the sealing or mounting, meaning that they are not in contact in particular with sealant surfaces, it is advantageously not necessary to perform technologically difficult finishing work, in particular for the removal of injection flashes, and/or for polishing the surface.

The invention is based on an advantageous interconnection of shape and function of the molded part, and/or its various segments and areas located in the inner channel, with a special injection technique and geometry realized from the interior of the part to be molded. The torsional moment is advantageously increased by the invention, with the molded part according to the invention having a resulting load resistance in a screw-in test by 40 percent up to approximately 60 percent compared with a component manufactured under the procedure according to WO 2009/124994 A1.

Considered particularly suited for the gate are injection points located between the clamping area, that is, axial segments with the function of direct or indirect holding, and/or arresting of the connector part segment, and sealing areas, that is axial segments with the function of attachment areas for a peripheral gasket. Therefore, such preferred injection points can be located especially—without being restricted to—such segments, which serve exclusively the support, and/or guiding of the connector part.

In terms of the molded part according to the invention preferably formed as a screw or a nut with at least one thread, a greater post-pressure effectiveness can be achieved according to the invention following the injection into the cavity in the area of structural bearing load areas at a later time, such as thread flanks, that is in particular in the threaded area compared with the torque transfer area. This results in particular in a very homogeneous structure formed during injection molding, and seamless joints in the case of a ring, disc, umbrella gate system, preferably in an exterior thread area, as well as in the area of internal or external recesses, such as peripheral nuts, and/or in the area of interior or exterior steps, such as protrusions or recesses.

Other advantageous design characteristics of the invention are included in the subclaims, and the following description

BRIEF DESCRIPTION OF THE DRAWINGS

With the help of multiple preferred design examples, the invention will be explained in more detail in the following. The figures show.

Figure 1:
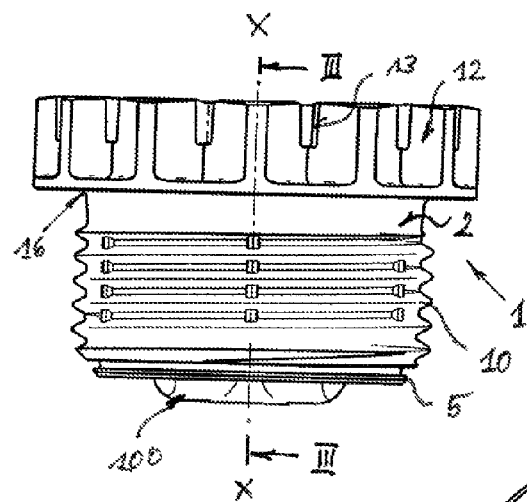
FIG. 1 in side profile, a first design of the molded part according to the invention with circular cross section, producible by injection molding procedure according to the invention, FIG. 2 a bottom view of the molded part created in FIG. 1 with the gate system still in place, FIG. 3 a section through the molded part according to the invention shown in FIGS. 1 and 2 along the line III-III in FIG. 1, respectively FIG. 2, with the gate not yet removed, FIG. 4 a similar section view of the molded part acc. to the invention as in FIG. 3, however, in the installed condition with a connector part, FIG. 5 a view of an additional molded part according to the invention, shown as in FIG. 4 in the installed condition, FIG. 6 a top view of a second design of the molded part according to the invention with circular cross section, producible in particular by injection molding procedure according to the invention, FIG. 7 a section through the molded part according to the invention shown in FIG. 5 along line V1-V1 in FIG. 5, with the gate not yet removed, FIG. 8 a schematic view for the construction of the transition of a base body to a flange hub of the molded part acc. to the invention, FIG. 9 an additional design of the molded part acc. to the invention in the installed condition, in a design as in FIGS. 4 and 5.

Please note explicitly in the following description that the invention is not restricted to the design examples, nor to any and all multiple characteristics of the combinations of characteristics described. Rather, each individual partial characteristic of each design example separately may be of inventive significance, especially related to the partial characteristics described for itself, and in combination with any characteristic of another design example.

Identical parts in the various figures of the drawing are always depicted with the same reference number, so that as a rule they are described only once.

Figure 2:
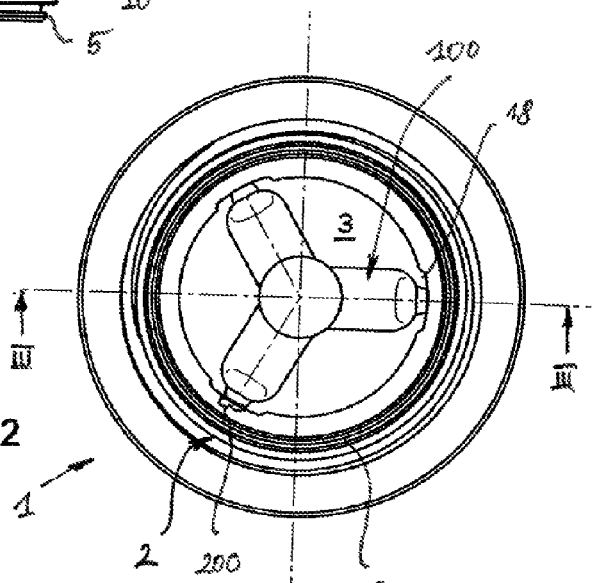

FIGS. 1 to 5 show the first design of molded part 1 according to the invention, which features—as illustrated in the bottom view in FIG. 2—a circular cross section. In particular it pertains to a hollow screw, producible acc. to an injection molding procedure per the invention.

Figure 4:
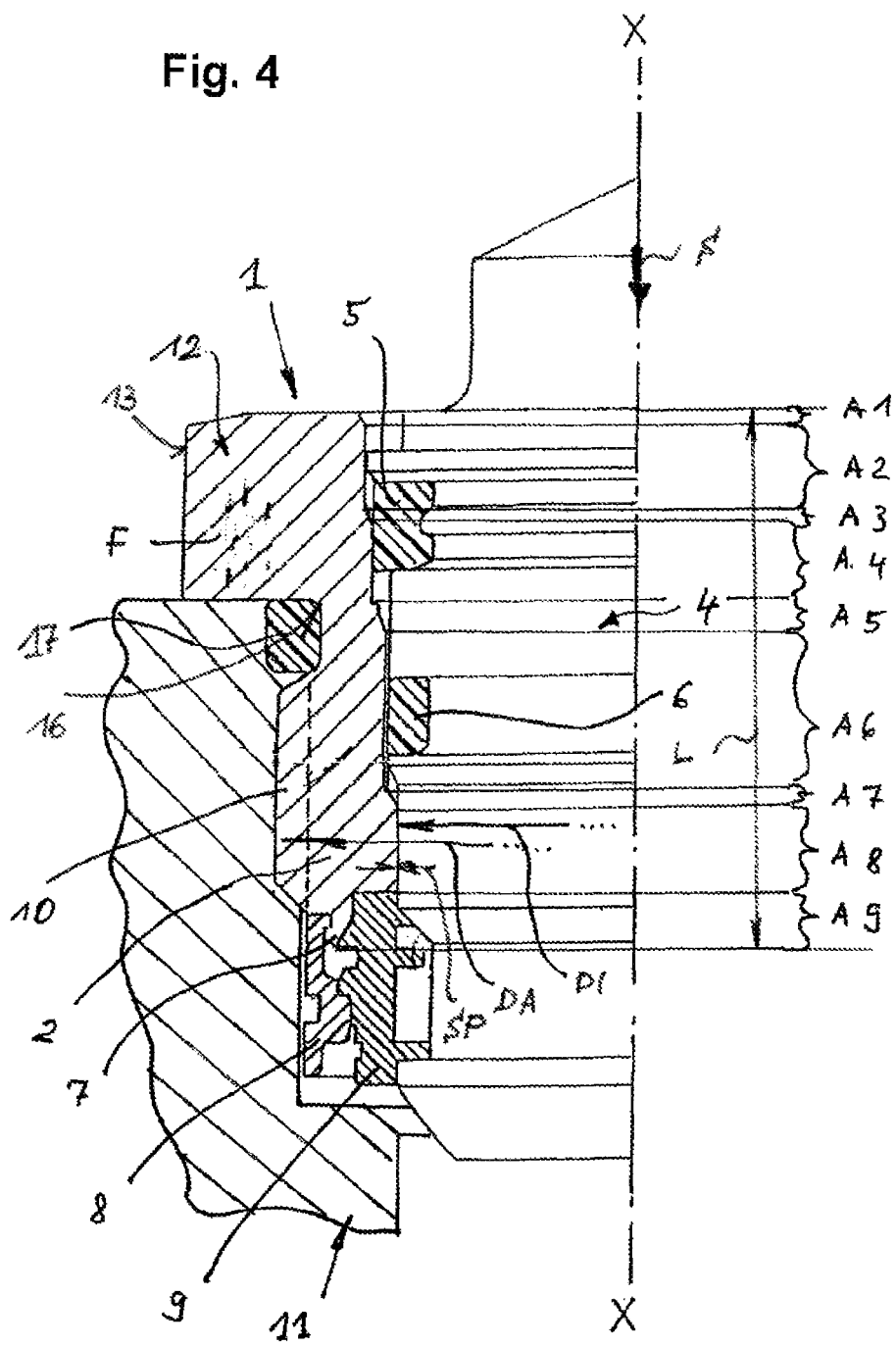
Figure 5:
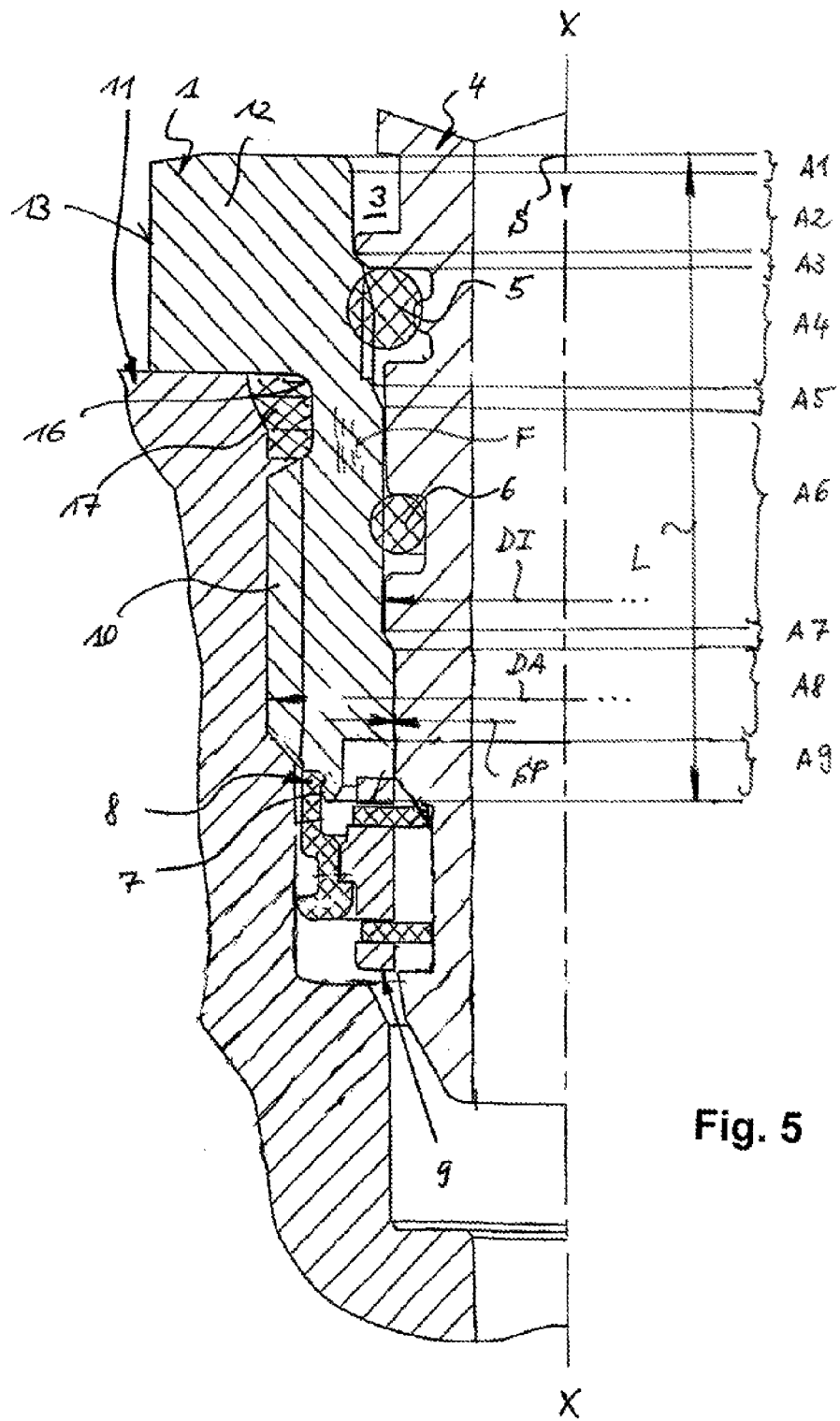

Molded part 1 features a hollow-cylindrical base body 2, with its inner channel 3, as illustrated in particular in FIGS. 4 and 5, intended for the sealing reception of connector part 4. On the inside, X-X segments A1, A2, A3, A4, A5, A6, A7, A8, A9 with respective different functions align in axial direction, such as segments A4, A6 for the application of one or multiple peripheral gaskets 5, 6, which can be located in particular on connector part 4. One, or when indicated, multiple segments, such as mounting segment A9 for the direct or indirect fastening, and/or arrest of connector part 4, and/or conical segments A1, A3, A5, A7 or cylindrical segments A2, A8 for the support and/or guiding of connector part 4.

For example, in the design illustrated, a special filigree formed exterior ring bulge 7 is placed on the exterior circumference of base body 2 of latching segment 9 positioned at the end, with retaining cage 8, preferably circular, attachable, in particular latchable, for the indirect mounting, and/or arresting of connector part 4, interacting with at least one latching element 9 on connector part 4. FIGS. 4 and 5 illustrate that this indirect fastening, and/or arresting can be realized in various types and manners. Related to the particulars of the technical solutions illustrated in FIG. 5, reference is made to EP 0 913 618 B1 in its entirety.

In addition, a minimum of one internal thread, and/or—as illustrated—one external thread 10 is located on base body 2. The invented molded part 1 can be screwed to another structural component 11 by means of this external thread 10.

For the production of molded part 1 according to the invention, a plasticized polymeric mass containing fibers F is injected via a minimum of one injection port of a molding device (not shown) into a hollow space, a so-called cavity, into the molding device, and molded part 1 is removed from the device after the solidification of the polymeric mass.

According to the invention, the injecting is carried out by radial injection into the cavity from the inner channel 3 towards the exterior via the injection port—which will be described in detail in the following—into a segment or a region of the segment not serving for the application of a peripheral gasket 5, 6, or for the fastening, and/or for the arrest of connector part 4.

The plasticized polymeric mass may be a resin which forms a duroplastic matrix of molded part 1. The plasticized polymeric mass may consist of epoxy resin (EP), vinyl ester resin (VE), phenol formaldehyde resin (PF), diallyl phthalate resin (DAP), methacrylate resin (MMA), polyurethane (PUR), amino resin, melamine resin (MF/MP), or urea resin (UF).

Molded parts 1 with duroplastic matrix can no longer be worked following the hardening, respectively the crosslinking of the matrix. However, they possess a large range of temperature applications, and highest degrees of stability. This applies in particular to thermosetting systems, set under high temperatures.

However, in the preferred design, the plasticized polymeric mass is a plastic material that forms a thermoplastic matrix of molded part 1. In that case, basically all commonly used thermoplasts for constructive purposes may be utilized. However, it is of particular advantage if the plastic material can be a polyamide (PA), in particular a polyphthalamide (PPA), a polypropylene (PP), a polyether ether ketone (PEEK), a polyphenylene sulfide (PPS), a polysulfone (PSU), preferably a polyphenyl sulfone (PPSU), or a polyether sulfone (PES), a polyetherimide (PEI), a polyethylene terephthalate (PET), or a polybutylene terephthalate (PBT).

Fiber-reinforced plastic materials with a thermoplastic matrix can subsequently be reshaped or heat-sealed. Following the cooling period, molded parts 1 are ready to use, however, they will soften at elevated temperature. With increasing fiber content, the tendency towards plastic flow is decreased. The advantage of the thermoplastic materials listed as particularly preferred consists specifically of the high matrix stability and utilization option at elevated temperature.

The fibers are indicated in the segmental illustrations of FIGS. 3, 4, 5, and 6, and identified with the reference symbol F. Amorphic fibers F, such as fiberglass, anisotropic fibers F, such as carbon fibers, and/or aramide fibers may be used as fibers F. The volumetric content of fibers F in the plasticized polymeric mass can range between 2.5 to 75 percent, preferably within the range of 15 to 40 percent, respectively a weight percent of 30 to 75 percent, preferably a weight percent of 50, 60, or 65 of fiberglass. Fibers F, in particular in a design as fiberglass, may range in length between 0.1 millimeters to 10 millimeters, preferred as so-called short fibers within the range of 0.2 to 0.5 millimeters, or as long fibers within the range of 1.0 to 10.0 millimeters.

In terms of large structural component stability, it has been shown to be advantageous if the injection into the cavity—that is, for example, in the proximity of the frontal sides of molded part 1—is carried out in such manner that fibers F in base body 2 will orientate predominantly parallel, that is more than 50 percent for fiberglass in particular, towards axial direction X-X, in a manner advantageous for the subsequent torsion load caused by a screw tightening device. This can be shown in a computer tomography x-ray analysis, for example. It should be noted that the device under the described stress applies a torsional moment. However, mechanical axial tensions also result from the forces occurring during the tightening of the screws of threaded part 1 via the threads, so that a three-axis tension state with large axial forces occurs in the maximum load area near the point of force application.

Fibers F may have a median diameter within the range of approximately 3 μm to 35 μm, preferably within the range of 5 μm to 20 μm.

With amorphic fibers F, the advantage of the shape of the fiber lies almost solely in the utilization of the size effect. The modulus of elasticity of the compact material and the modulus of elasticity of fiber F are nearly equal. The basic targeted goal should be that fibers F possess a greater modulus of elasticity and a greater tensile strength in the longitudinal direction than the solidified polymeric mass. In addition, the breaking strain of the matrix should be greater than that of the fibers. Amorphic fibers, drawn from the melted mass, however, have the advantage that internal compression strengths are created on their surface during the cooling process, which can prevent the formation of tears in fiber F.

Anisotropic fibers, especially carbon fibers, are utilized whenever high mass-related stabilities and grades of rigidness are needed. In carbon fibers, which usually have a diameter of approximately five to eight μm, and are produced these days mostly from polyacrylic nitrile, stability and rigidity in direction of the fiber are significantly greater than transverse to the fiber direction. Their essential characteristic is their high tensile strength. The use of standard flat fibers is another possibility.

According to the invention, the use of aramid fibers as fibers F may be accepted as well. According to a definition by the U.S. Federal Trade Commission, aramides or aromatic polyamides describe long-chain synthetic polyamides with at least 85 percent of the amide groups bound directly to two aromatic rings. Similar to carbon fibers, aramid fibers feature a negative thermal expansion coefficient, which is that they become shorter through heating. Their specific stability and elasticity modulus are lower than those of carbon fibers. In conjunction with the positive expansion coefficient of the material of the matrix, highly dimensionally accurate molded parts 1 can be produced. However, compared with molded parts 1 containing carbon fibers, the compressive strength of such molded parts 1 is reduced.

As example of a material with excellent suitability for the process according to the invention, respectively molded part 1 according to the invention, a thermoplastic construction material reinforced with 50 percent fiberglass by weight (length: 0.3 millimeters, diameter: 10 μm) shall be listed here, produced on the basis of a partially crystalline, partially aromatic co-polyamide. This material, known under the name PA 6T/6I (according to ISO), or polyphthalamide (according to ASTM), respectively under the trademark "Grivory HTV-5H1 black 9205", for example, is characterized by greater stability and rigidness, as well as better resistance to chemicals and thermoforming, compared to other polyamides.

In contrast to calendering, usually only used for the production of even layers with uniform thickness, the cavity of the tool determines the shape and the surface structure of finished part 1 in injection molding, so that molded parts with circular cross segment can be produced in one working step. When injecting into the cavity, thread or threads 10, as well as interior recesses, exterior recesses, such as circumferential grooves, interior steps (transition A8/A9), or exterior steps (transition 2/12), as well as radial protrusions or recesses, and/or conical segments A1, A3, A5, A7 can be formed at or in molded part 1. In that manner, with injection into basic body 2 of the hollow-cylindrical molded part 1, for example, axial segments with varying wall thickness W (FIG. 3, 7) can also be formed. This is the case, for example, with constant external diameter over axial length L of molded part 1 (generally referenced in FIGS. 3, 4, 5, 6, and 7 with the reference symbol DA), in as far as segments A1, A2, A3, A4, A5, A6, A7, A8, A9, which are arranged axially in a row over length L of inner channel 3, are formed with varying internal diameters (generally referenced in FIGS. 3, 4, 5, and 7 with the reference symbols DI). It must be noted that inner channel 3 generally tapers in particular in insertion direction S of connector part 4, wherein interior diameter DI remains constant in some segments A2, A4, A6, and A8. However, the axial last segment A9—viewed from insertion direction S—has a widened interior diameter DI for receiving locking element 9. Thus, varying wall thicknesses W result with approximately constant exterior diameter DA. With the injection molding process—as shown in all designs of molded part 1 according to the invention—a flange hub 12 can be formed during injecting at base body 2, in particular at the end, preferably also radially dilated, which features in particular a polygonal external contour 13 for manual gripping or as contact surface for a tool. In contrast to the molded part designs illustrated according to the invention, it is hereby possible and advantageous, to carry out the injection in an axial area (for example, segments A1, A2, A3) of base body 2, where flange hub 12 is located.

Figure 3:
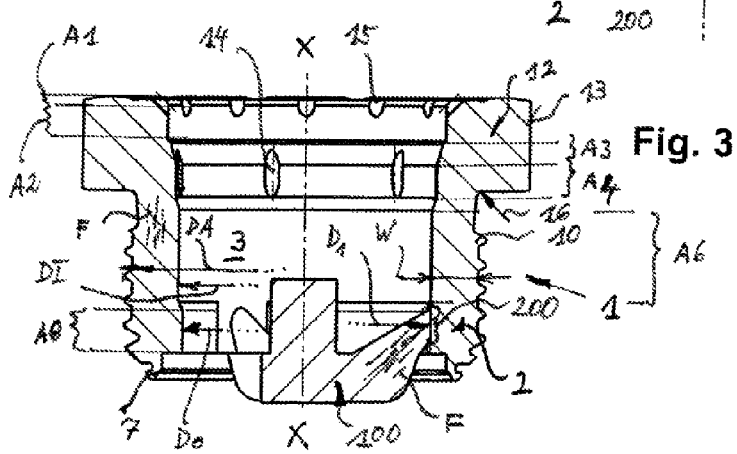
Figure 7:
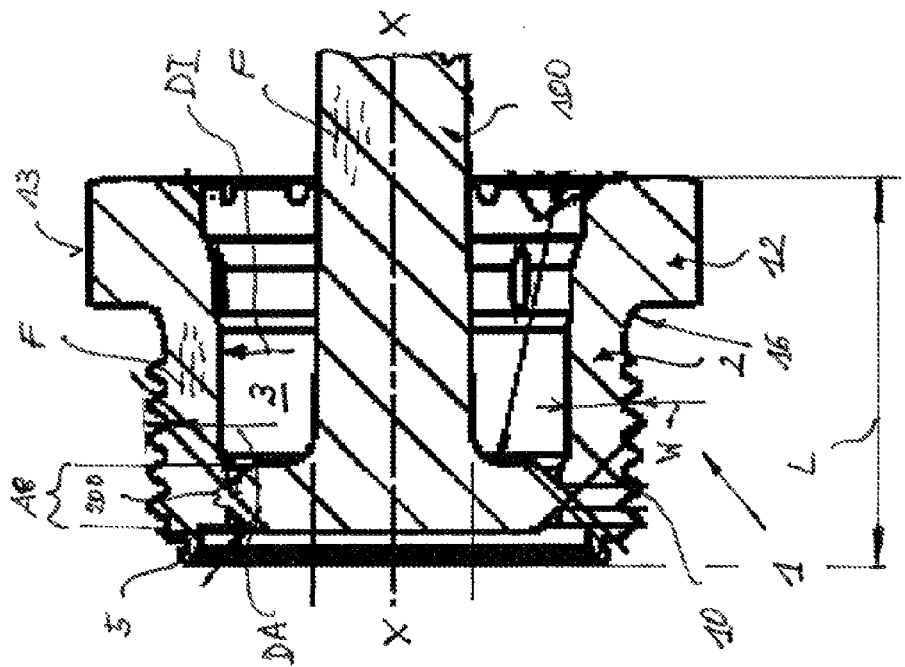

Injection through the injection port preferably also can be carried out—as illustrated in FIGS. 3 and 7—in a segment A8, or in an area of the segment of base body 2, where base body 2 (aside from the "wall thickness" in the area of flange hub 12) features a maximal wall thickness W. As illustrated in FIG. 3 and FIG. 7, the injection site can be located advantageously less than third of the entire length L of screw part 1 away from the loose end of screw part 1, located opposite flange hub 12. For the filigree formed exterior ring bulge 7 located at that end, the efficiency of the post-pressure then is extremely high. This segment A8 may be in particular a cylindrically formed segment A8 of base body 2, serving the support, and/or guidance of connector part 4. It is possible that connector part 4 features a leeway SP to molded part 1 in the assembled state in this segment A8, so that it advantageously is not needed in this segment A8, if the gating is carried out there, to perform technologically complex follow-up work, in particular for the removal of injection flashes, and/or for polishing the surface.

With injection molding, the melting temperature may be approximately 100° to 350°, the injection pressure approximately 400 bar to 1600 bar, and the tool temperature approximately 40° to 160°. When processing thermoplastics, the screw is relatively hot for melting the thermoplastic material. The tool, however, is relatively cool for cooling the molded part 1 being produced. This is denoted as a cold runner process. When processing duroplasts, the temperature of the plastification unit must be adapted to the flow-curing behavior, and generally is lower than with thermoplastics, whereas the tool must be kept at a hotter temperature than the injecting unit, so that the mass can harden there. This is denoted as a hot runner process. According to the invention, the cold runner process is preferred to the hot runner process.

The volume loss due to the solidification of molded part 1 can be balanced with post-pressure applied prior to the removal. When producing molded parts 1 with the process according to the invention, there was greater efficiency of the post-pressure, that is in particular a greater degree of filling of the cavity, compared with molded parts produced according to the known process named above, expressed in improved weld seam strength and structural part stability in the finished molded part 1, as well as greater density by approximately ten percent. The density is nearly identical to the theoretically calculated density.

Figure 6:
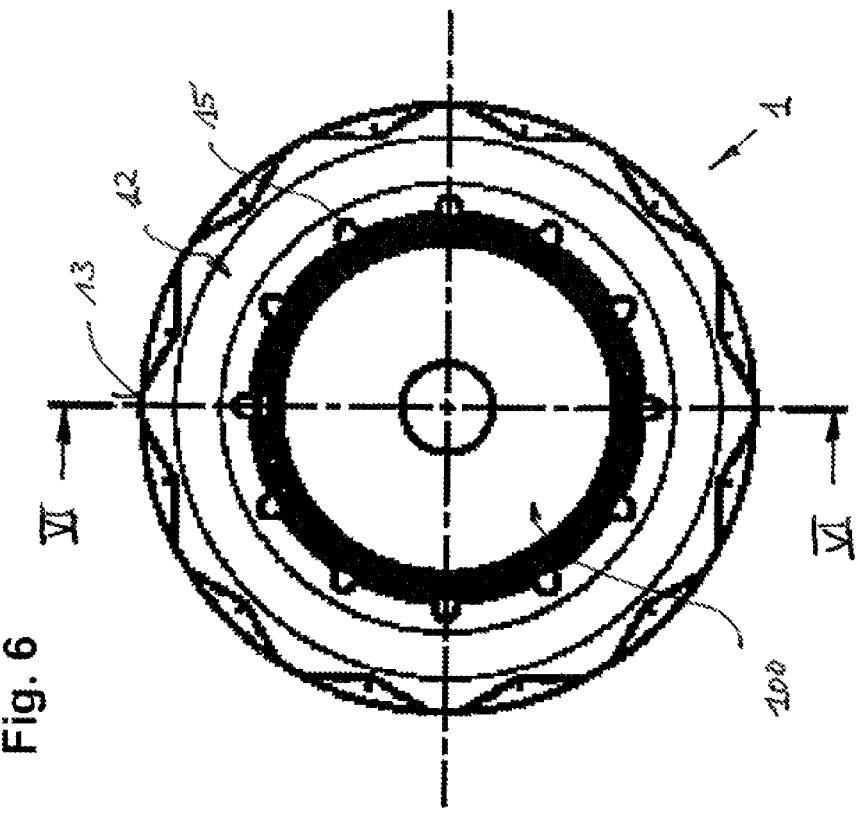

FIGS. 6 and 7 show a second design of a molded part 1 according to the invention, which is characterized by the same layout as the molded part 1 shown as the first design example, producible according to an injection molding process of the type according to the invention.

The two exemplary shown molded part designs according to the invention differ in the method of injecting into the cavity, in particular how the transition from one influx duct for the plasticized polymeric mass into the mold area of the cavity for the formation of the molded part is carried out. The design of this area, and thus the method of connection of molded part 1 to be created with injection molding to one residual body to be removed following the injection molding process, the so-called casting, is called "the gate" in the injection molding technique.

As mentioned before, gates, depicted with the reference number 100, are included in the illustrations, except in FIGS. 4 and 5. According to the invention, such bonded connections of molded part 1 to gate 100 are preferred, characterized in the injection molding technique with tunnel, ring, disc, or umbrella gate. Gate 100 must be separated from molded part 1 in a subsequent step, since it is attached to the component. This can be carried out through mechanical processing, such as punching, drilling, milling, turning, cutting, and/or honing, or thermal processing, such as flame cutting, or laser cutting.

In the design of molded part 1 according to the invention as depicted in FIGS. 1 to 3, a so-called tunnel gate is carried out. The injection into the cavity is carried out through a minimum of two, specifically three, axially or specifically centrally symmetrical arranged injection ports, located offset to each other on the circular interior diameter of molded part 1 in the preferred design by 120° according to the circumference, reflected in particular in the shape of gate 100 illustrated in FIG. 3. Two, three, four, or five injection points are possible. The gates run spoke-like radially from the interior to the exterior, with a possible provision for a tangential incline, which is a run not at a right angle to the tangent to the circumference of inner channel 3 without leaving the framework of the invention. In such a gate, one each weld seam is located centrally between the injection points.

According to the second design of the invention, injection is carried out, as illustrated in FIGS. 6 and 7, through a single circular running injection port. This type of bonded connection of molded part 1 to gate 100 is called disc gate, sometimes also referred to as a ring gate. Normally (and here as well), however, the term ring gate is used as a higher level, more general term, in order to subsume a disc gate (FIG. 6, 7), an umbrella gate (with conical forming of gate 100), and a so-called wreath gate (circular from the exterior). All these gates have the advantage that no welding seam will result in molded part 1. In particular with a disc gate, a maximum connection area between molded part 1 and gate 100, and thus very high homogenicity of the structure of the molded part can be achieved with short flow runs of the polymeric mass to injection port 200.

The gate, in particular gate 200, where the injection is carried out via the injection port, is preferably located between an area for the mounting of a circumferential seal 5, 6, and an area for the mounting, and/or arresting of connector part 4, or between two areas for the mounting, and/or arresting of connector part 4.

Generally, it is advantageous if gate point 200 is at a distance of less than one third of total length L of screw part 1 from one of the two free ends of screw part 1. In particular—as illustrated for gate segment A8 in FIG. 3 and FIG. 7—less than one-third of the entire length of screw part 1 from the free end of screw part 1, located on the opposite on flange hub 12, and where the filigree structure of external ring bulge 7 may be located. Such filigreed structures as external thread 10 and transition area 16 of flange hub 12 to base body 2 represent areas of threaded part 1 with maximal mechanical load.

A short distance of the injection port to these areas results in short flow runs, thus assuring an optimally high, and locally above average stability The invention is not restricted to the design examples illustrated, but comprises all designs with identical effect in terms of the invention. Therefore, it is possible that the injection can be carried out in a different manner, as shown in the above designs. In that connection, special reference is made to the recesses shown in FIGS. 3 and 6 in the circumferential area of inner channel 3, denoted by the reference symbols 14 and 15, located respectively in segments A3, A4, and thus partly in the cylindrical segment A4, which serves for the mounting of circumferential seal 5, and/or in the taper segment A1, and partially in the cylindrical segment A2 for the support, and/or for guiding of connector part 4. In the assembled state, as shown in FIG. 4, circumferential seal 5 also can be located in the last referenced segment A2—however, not underneath the wall system. Recesses 14 and 15 in the circumferential surface of inner channel 3 represent specifically created leakage paths for a gaseous fluid in particular, which can be controlled preferably by installation of a valve cooperating with molded part 1 according to the invention. These recesses 14 and 15 also represent areas with a particular suitability for the connection of gate 100. However, in this case, if the injection is carried out via an injection port in a segment A4, serving integrally for supporting of the circumferential seal 5, and wherein recess 15 is only a partial area, the circumferential seal 5 is not in contact with the gate. Recesses 15 in segment areas A3/A4 therefore are ring gates in particular, and recesses in the segment area A1/A2 are particularly suitable for an umbrella gate. To ensure sufficient leakage flow in such a case, recesses 14, 15 can be built wider, and/or deeper than shown in the illustration.

In addition, a specialist may provide further technically advantageous measures without departing from the framework of the invention. For example, FIGS. 2 and 3 show that injection ports 200 of the screw part 1 are arranged in recesses 18 on the circumference of inner channel 3. These recesses 18 are shown in particular detail in FIG. 2. They are arranged in an area of segment A8 where base body 2 features a maximal wall thickness W, in particular in a segment A8, which serves for supporting and/or guiding of connector part 4.

According to FIG. 3, a height H of the recess 18 results as half the value of the difference between the interior diameter $D_1$ of the screw part 1 at the injection port 200 (right half of the figure), and the interior diameter $D_0$ of screw part 3 at the point in segment A8 where no gate 100 is located (left half of the figure). Preferably, height H may be approximately up to 0.5 millimeters, in particular 0.25 mm up to 0.35 mm. Following the separation of gate 100, a burr may remain inside the recess without any negative effect on the functionality of screw part 1 according to the invention. Thus, follow-up work can advantageously be avoided. Interior diameter $D_0$ of the screw part 1 at the point in segment A8, where no gate 100 is located (left half of the figure), preferably may be as large as the interior diameter DI of the next cylindrically formed segment A6 in axial direction X-X.

In case interior recesses such as circumferential grooves, and/or interior gradings, such as radial protrusions or recesses are formed inside inner channel 3 of molded part 1, not shown in the design examples, effectuating in both directions of the longitudinal axis X-X of molded part 1 an undercut recess, that is a recess, opposite the remaining cross segment of inner channel 3, it must be noted that these—like the mounting and sealing segments—are not suitable for a gate. In a segment undercut in such manner, it is extremely difficult to separate a gate 100. Conical segments A1, A3, A5, A7 for the support, and/or guiding of connector part 4 as such are less suitable as locations for the injection of the mass, with the exception described for recesses 15.

In addition, as a further technically advantageous means for increasing the bearing capacity of molded part 1 according to the invention, an exterior circumferential seal 17 for molded part 1 according to the invention may be supplied during threading into component 11, with the contour of transition 16 of flange hub 12 towards base body 2 as shown in FIGS. 4 and 5—not defined as known by a circular arc segment, or in particular as the segment of a quadrant, but according to the method of a so-called tree root geometry. This provides geometry of transition 16, formed as wedge or groove for seal 17 effecting a reduction in notch stresses. Advantageously, the torsional moment that molded part 1 according to the invention can resist during screwing into component 11 is increased by approximately another 20 percent, compared with the conventional shape.

Figure 8:
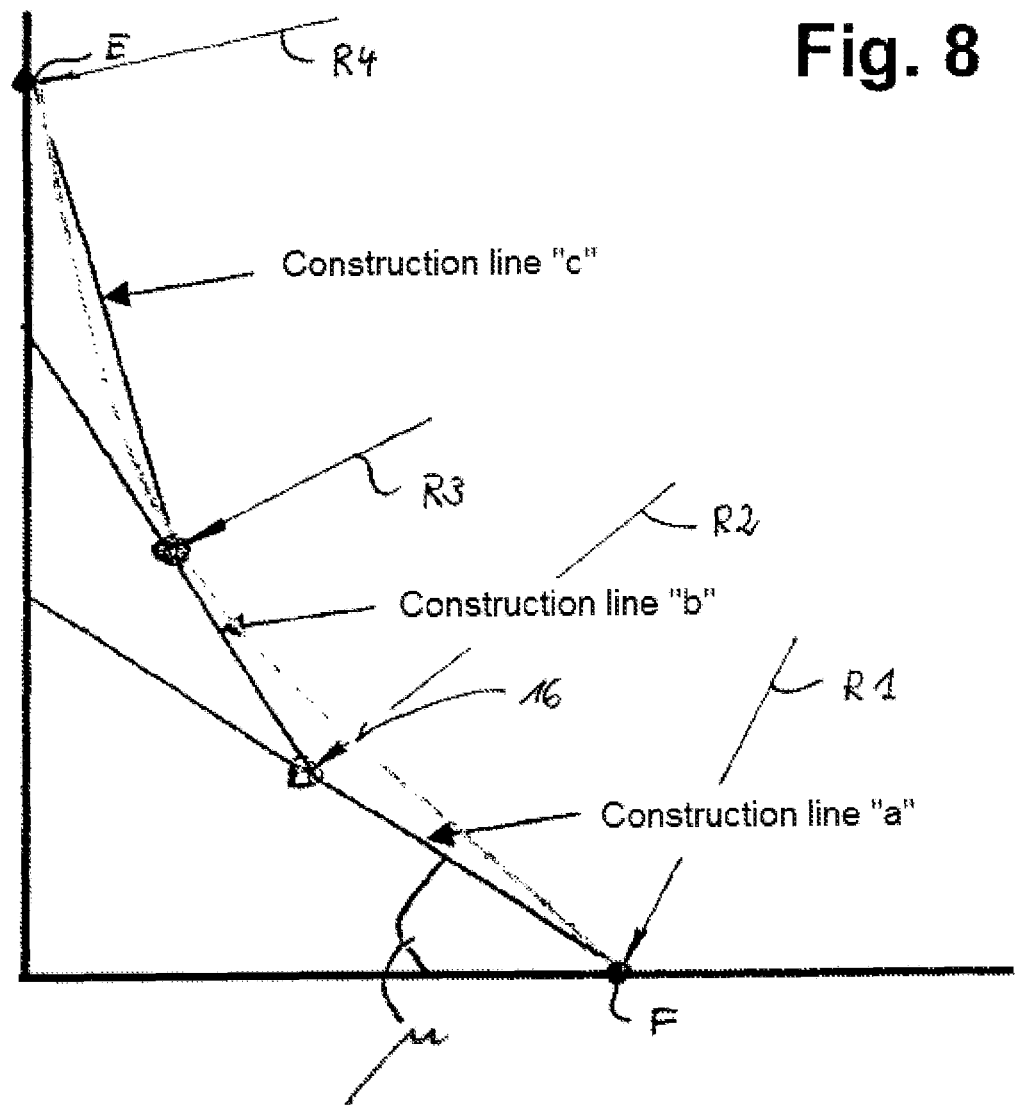

FIG. 8 illustrates the construction of this so-called tree root geometry for the above-referenced transition 16. The construction is carried out in the following manner: initially, construction line "a" is created by a first cut, which is at an angle μ to flange hub 12 or base body 2, respectively, with angle μ in particular between the range of 30 and 60 degrees, preferably at 45 degrees. A construction line "b" is created in a second step, originating in the center of the hypotenuse of the triangle formed in the first step. This construction line runs out towards flange hub 12 or base body 2 in such manner that in turn, a triangle with equal sides is created. A construction line "c" is created in a third step, originating at the center of the hypotenuse of the triangle formed in the second step, also creating a triangle with equal sides, as shown in FIG. 8. This is a known construction method, referred to as "method of the traction triangles." In a final fourth step, ends E, F of construction lines "c" and "a" are connected with a curved line 18, which approximately rounds off the polygonal structure created in the first to third step. For this, in particular several circular arches may be used, which tangentially transition into each other. Exemplary radii corresponding with such circular arches are referenced in FIG. 8 as R1, R2, R3, and R4. The construction as well is not limited to three construction lines, but any number may be added, preferably dependent on angle μ.

A molded part 1 according to the invention, which features all of the above described features, is characterized by base body 2 featuring injection ports 200 on the wall of inner channel 3, arranged in a segment A1, A2, A5, A7, A8, A8 or in area 14, 15 of a segment A1/A2, A3/A4, with the entire segment, or the respective area not serving for the mounting of a circumferential seal 5, 6, or for the fastening, and/or for arresting of connector part 4. These injection ports are referenced in the illustration by the reference symbol 200, and depending on the processing method used for the removal of the gate, are recognizable in macroscopy or microscopy as gate remnants, or can be detected at least with a light microphotograph, illustrating a radial course of the fibers originating at the injection port in molded part 1 according to the invention.

Figure 9:
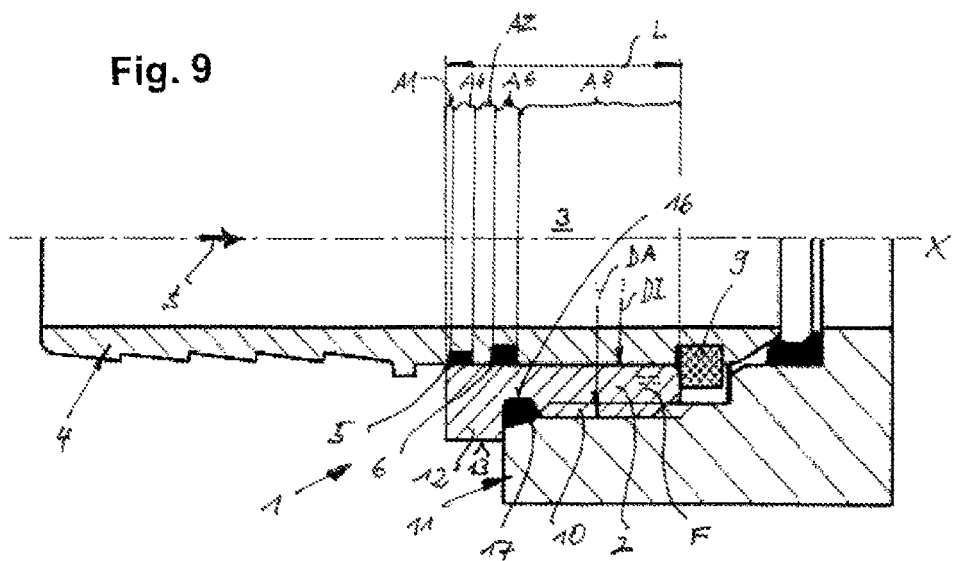

In molded part 1 shown in FIG. 9, the hollow cylindrical base body 2 features an inner channel 3, with a constant interior diameter over its entire length L—except for the tapered inlet segment A1. There as well, X-X segments are lined up in axial direction with respective varying functions, referenced corresponding to their function for the mounting of the two circumferential seals 5, 6 shown, as well as for the support, and/or guiding of connector part 4 with the reference symbols A1, A4, AZ, A6, and A8. The intermediate segment AZ corresponds to segment A5 in the designs according to FIGS. 4 and 5, however, does not feature a conical shape. A special segment A9 for the direct or indirect mounting, and/or arrest of connector part 4 and therefore respective, filigree shaped structures, does not exist. Here, locking element 9 for connector part 4 extends behind the end of molded part 1 when mounted, located opposite flange hub 12. Thus, it is demonstrated that not every segment in the inner channel 3 needs a respective interior diameter DI, even though this is preferred in the other designs of the invention.

Also this design of molded part 1 according to the invention is created by radial injection into the cavity from the inner channel towards the exterior via the injection port into a segment or a region of the segment not serving for the application of a circumferential seal 5, 6. In this case as well the cylindrically formed segment A8 of base body 2 is intended to support and/or guide connector part 4. The intermediate segment AZ between the two contact segments A4, A6 for the seals 5, 6, is basically suitable. However, when connecting connector part 4, at least one seal 6 would cover this segment AZ, including the possibly still existing gate remnant inside. This is considered less advantageous due to the associated potential of damage to seal 6. However, depressions 18 could be provided over the circumference of the inner channel 3 in such intermediate segment AZ as described, or the follow-up work after the removal of gate 100 needs to be conducted with more diligence. In that design, injection port 200 may be located not only in the last third of length L (as seen in connection direction S), but also in the central third thereof.

For the geometry of transition 16 from flange hub 12 to base body 2 of the molded part 1, which in turn is formed as sealing wedge or sealing groove, the tree root structure described may be provided as the preferred type. In case an O-ring is inserted as exterior circumferential seal 17, the sealing effect increases due to the deviating contours of seal 17 and groove 16 when seal 17 is in an uncompressed state.

As yet the invention has not been restricted to the combinations of features defined in the independent claims 1 and 20, but may be defined by any other combination of certain features of all individual features disclosed. This means that basically each individual feature of the claims may be omitted or replaced with an individual feature disclosed at another location in the application. In this respect, the claims must be considered merely as first attempts at formulating an invention.

The invention claimed is:

1. A process for the fabrication of a molded part with circular cross section:
    providing a molding tool defining a cavity in the shape of the molded part, the molded part having a hollowed-out cylindrical base body, and an inner channel configured for sealing engagement with a connector part, the inner channel having a plurality of segments formed along the axial length thereof and configured to perform a variety of functions, the base body further including at least one of an internal thread and an external thread,
    injecting into the cavity of the molding tool a fiber-containing plasticized polymeric mass via at least one injection port provided in the molding tool,
    hardening the polymeric mass to form the molded part,
    removing the molded part from the tool,
    wherein the step of injecting into the cavity is carried out radially outward via the injection port from the inner channel in a direction towards the exterior and occurs in at least one of the plurality of segments, or in an area of a segment, which does not serve for the mounting of a circumferential seal, or the mounting and/or arrest of the connector part.

2. The process according to claim 1, wherein the segments are formed with varying internal diameters and/or with varying wall thickness.

3. The process according to claim 2, the injection step is carried out via the injection port in a segment or in an area of a segment of the base body where the base body features a maximum wall thickness of the molded part.

4. The process according to claim 1, wherein the injection step is carried out via the injection port in a cylindrically shaped segment of the base body, the cylindrically shaped part supporting and/or guiding of the connector part.

5. The process according to claim 1, wherein the injection step is carried out via the injection port in the area of a segment that does not serve for mounting of the circumferential seal and the circumferential seal is mounted in an unattached manner to another portion of the segment that includes the area having the injection port.

6. The process according to claim 1, wherein the injection step is carried out via the injection port in a segment located between an area having a circumferential seal mounted thereon and an area having the connector part mounted thereto or arrested thereby, or between an area having the connector mounted thereon and an area arresting the connector part.

7. The process according to claim 1, wherein the injection port is located at an injection point positioned at a distance of less than one third of an overall length of the molded part from one of two free ends of the molded part, the molded part being a screw part and the injection point being located from the free end of the screw part opposite a flange hub where a filigree structure of an external ring bulge is located.

8. The process according to claim 1, wherein the injection ports are defined by injection point(s) of a screw part and are arranged in recesses on a circumference of the inner channel.

9. The process according to claim 1, further comprising the step of forming of a radial widened flange hub at an end of the base body during the injection step.

10. The process according to claim 9, wherein the injection step is performed via an injection port located in an axial area of the base body where the flange hub is being formed.

11. The process according to claim 1, wherein the injection step injects fibers into the base body that align predominantly parallel to the axial direction of the base body.

12. The process according to claim 1, wherein the injection step is carried out through one of a tunnel, ring, disc or umbrella gate.

13. The process according to claim 1, wherein the step of injecting is performed through a minimum of two axially or centrally symmetrical arranged injection ports.

14. The process according to claim 1, wherein the plasticized polymeric mass is a plastic material which forms a thermoplastic matrix and is one of a polyphthalamide (PPA) or a polyether sulfone (PES).

15. The process according to claim 1, wherein the step of injecting into the cavity causes formation in the molded part of one of internal recesses, external recesses, internal protrusions, external protrusions conical segments and conical segments.

16. The process according to claim 1, wherein the plasticized polymeric mass contains a proportion of fibers (F) in the range of 2.5 to 75 weight percent.

17. The process according to claim 1, wherein the fibers have a length within the range of 0.1 mm to 10 mm.

18. The process according to claim 1, wherein the fibers have a median diameter within the range of 3 μm to 35 μm.

19. The process according to claim 1, further comprising the step of forming a contour of an exterior transition of a flange hub to the base body according to the method of traction triangles with additional rounding.

* * * * *